United States Patent [19]

Kojima

[11] Patent Number: 5,698,285

[45] Date of Patent: Dec. 16, 1997

[54] ADHESIVE FOR OPTICAL DISK

[75] Inventor: Kazuhiro Kojima, Tokyo, Japan

[73] Assignee: Three Bond Co., Ltd., Tokyo, Japan

[21] Appl. No.: 731,529

[22] Filed: Oct. 16, 1996

[30] Foreign Application Priority Data

Oct. 19, 1995 [JP] Japan .............................. HEI 7-296280

[51] Int. Cl.$^6$ ........................................... B32B 3/06
[52] U.S. Cl. ........................ 428/65.2; 428/64.4; 522/64; 522/18; 522/39; 522/33; 522/167
[58] Field of Search .................. 428/65.2, 64.4; 522/64, 18, 39, 33, 167

[56] References Cited

U.S. PATENT DOCUMENTS

| | | | |
|---|---|---|---|
| 5,128,388 | 7/1992 | Komori et al. | 522/95 |
| 5,334,456 | 8/1994 | Noren et al. | 428/431 |
| 5,554,663 | 9/1996 | Desobry et al. | 522/8 |

FOREIGN PATENT DOCUMENTS

| | | |
|---|---|---|
| 62-199608 | 9/1987 | Japan . |
| 1-304107 | 12/1989 | Japan . |
| 5-135415 | 6/1993 | Japan . |

*Primary Examiner*—George F. Lesmes
*Assistant Examiner*—Cheryl Juska
*Attorney, Agent, or Firm*—Sughrue, Mion, Zinn, Macpeak & Seas, PLLC

[57] ABSTRACT

An adhesive for use in producing an optical disk comprising two transparent substrates bonded to each other with a photocurable adhesive at respective bonding surfaces thereof and having an information recording layer formed on one or both of the bonding surfaces is disclosed, which is a composition comprising ingredient (A) shown below and a photopolymerization initiator comprising ingredient (B) and/or ingredient (C) shown below:

(A) a radical-polymerizable vinyl compound, (B) an acylphosphine oxide compound represented by the general formula

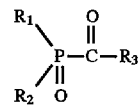

and (C) an α-aminoacetophenone compound represented by the following formula.

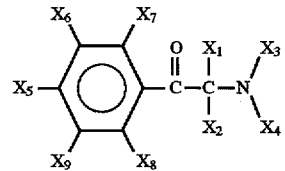

With this adhesive, optical disk substrates having an extremely low light transmittance can be easily bonded to each other in a short time period without impairing their appearance.

12 Claims, No Drawings

ADHESIVE FOR OPTICAL DISK

FIELD OF THE INVENTION

The present invention relates to an adhesive for use in producing an optical disk produced with a photocurable adhesive.

BACKGROUND OF THE INVENTION

A photocurable adhesive is a curable composition which contains a radical-polymerizable vinyl compound as the main component and cures through polymerization in a short period of time generally upon ultraviolet irradiation.

This kind of photocurable adhesives are required to cure rapidly upon irradiation with low-energy light. They are frequently used for bonding transparent materials having high ultraviolet transmission, e.g., glasses.

However, the prior art photocurable adhesives have a problem that they do not cure when used for the bonding of optical disks which contain a plastic having a layer of a vapor-deposited inorganic substance or have a coating of an organic dye, because the light which has passed through these materials has considerably reduced energy.

To eliminate this problem, a highly photosensitive adhesive was disclosed in JP-A-5-135415. (The term "JP-A" as used herein means an "unexamined published Japanese patent application.") However, the disclosed adhesive and catalyst system therefor have a drawback that the adhesive undergoes considerable yellowing through curing and this not only impairs the appearance of the product but also adversely influences readability. In addition, since much time is required for the adhesive to cure, it is impossible to cope with the desire for high production efficiency.

Although epoxy adhesives, SGAs, and the like are also used for bonding optical disks under these circumstances, such prior art adhesives have drawbacks as follows. Single-liquid type epoxy adhesives necessitate heating at around 100° C. for curing, and this heating tends to result in disk warpage.

Double-liquid type epoxy adhesives have poor workability because of the necessity of mixing the two components. Further, SGAs have a drawback that an aging period up to about 1 hour is necessary for obtaining a strength needed for practical use, resulting in low production efficiency, although they can be cured at room temperature.

As described above, the prior art adhesives have a problem of yellowing, which adversely influences an optical-disk performance, and have the most serious problem that the curing rate is so low that it is difficult to bond optical disks in a short time period without causing any trouble, resulting in low production efficiency.

Compositions containing acryloylmorpholine are disclosed in JP-A-1-304107 and JP-A-62-199608. However, any catalyst system for these compositions is not disclosed therein, and these compositions neither are intended for use in optical disk production nor relate to the present invention.

SUMMARY OF THE INVENTION

An object of the present invention is to provide a highly reliable adhesive which photocures in a short time period to have a strength sufficient for practical use even when applied to optical disks coated on both sides with an opaque material, not to mention optical disks having a transparent substrate on one side, and which eliminates the necessity of mixing too components, heating at a high temperature, and long-term aging after bonding and does not impair the appearance of the bonded product, by heighten the sensitivity of an adhesive to light.

As a result of intensive studies made in order to eliminate the problems described above, it has been found that an adhesive having extremely high sensitivity to light is obtained by mixing a specific photopolymerization initiator and a specific monomer, and that the desired production efficiency can be attained by using this adhesive for the bonding of optical disks. The present invention has been completed based on these findings.

To accomplish the object described above, the present inventors propose an adhesive for use in producing an optical disk comprising two transparent substrates bonded to each other with a photocurable adhesive at respective bonding surfaces thereof and having an information recording layer formed on one or both of the bonding surfaces, said adhesive being a composition which comprises ingredient (A) shown below and a photopolymerization initiator comprising ingredient (B) and/or ingredient (C) shown below:

(A) a radical-polymerizable vinyl compound, (B) an acylphosphine oxide compound represented by the general formula

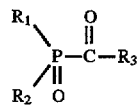

wherein $R_1$ represents a lower alkyl group, a lower alkoxy group, an unsubstituted aryl group, or an aryl group substituted with one or more lower alkyl groups or halogen atoms; $R_2$ represents a lower alkoxy group, an unsubstituted aryl group, or an aryl group substituted with one or more lower alkyl groups or halogen atoms; and $R_3$ represents a linear or branched alkyl group having 2 to 18 carbon atoms, a linear or branched alkyl group substituted with one or more acetyloxy groups, a cycloalkyl group having 3 to 12 carbon atoms, an unsubstituted aryl group, an aryl group substituted with one or more lower alkyl groups, lower alkoxy groups or halogen atoms, or a group represented by the following formula:

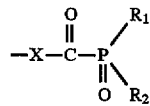

(wherein $R_1$ and $R_2$ are the same as defined above, and X represents a p-phenylene group), (C) an α-aminoacetophenone compound represented by the following formula.

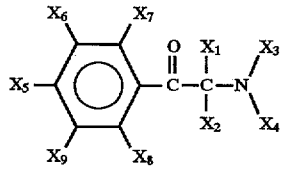

DETAILED DESCRIPTION OF THE INVENTION

Ingredient (A) used in the present invention is not particularly limited as long as it has at least one ethylenic double bond in the molecule. Specific examples thereof include 2-hydroxyethyl (meth)acrylate, 2-hydroxypropyl (meth)acrylate, diethylene glycol di(meth)acrylate, triethylene glycol di(meth)acrylate, 2,2-bis(4-methacryloxydiethoxyphenyl)propane, 2,2-bis(4-methacryloxydiethoxyphenyl)propane, 2,2-bis(4-allyloxydiethoxyphenyl)propane, dicyclopentenyl (meth) acrylate, dicyclopentenyloxymethyl (meth)acrylate, (meth) acrylic acid, cyclohexyl (meth)acrylate, tetrahydrofurfuryl (meth)acrylate, 2-ethylhexyl (meth)acrylate, methoxycarbonylmethyl (meth)acrylate, ethoxycarbonylmethyl (meth) acrylate, acid phosphooxyethyl (meth)acrylate, isobornyl (meth)acrylate, hydrogenated dicyclopentadienyl di(meth) acrylate, vinyl acetate, methyl vinyl ether, styrene, vinyltoluene, and N-vinylpyrrolidone. (The term "(meth) acryl-" as used herein means "acryl-" or "methacryl-".)

One of such vinyl compounds or a mixture of two or more thereof can be used as ingredient (A) in the present invention. Other kinds of usable vinyl compounds include (meth) acrylates each having one or more urethane bonds in the molecule, epoxy (meth)acrylates each having two or more vinyl groups per molecule, and polybutadiene (meth) acrylate. By using these compounds in combination with any of the above-enumerated vinyl compounds (A) according to need, the flexibility, heat resistance, and other properties of the photocurable adhesive can be regulated in wide ranges.

Methacryloylmorpholine and/or acryloylmorpholine may be incorporated in ingredient (A) if desired and necessary, in order to further improve photoreactivity. Preferred of these is acryloylmorpholine, which has higher reactivity.

In the present invention, increasing the addition amount of (meth)acryloylmorpholine accelerates the reaction of ingredient (A). However, too large an addition amount thereof may impair the stability of the adhesive (there are cases where gelation occurs upon exposure to, e.g., fluorescent light). Although the addition amount of (meth) acryloylmorpholine suitable for practical use of the adhesive varies depending on the radical-polymerizable compound used therewith, it is desirably from 1 to 90 parts by weight, preferably from 10 to 30 parts by weight, per 100 parts by weight of ingredient (A). Addition amounts of (meth) acryloylmorpholine smaller than 1 part by weight are insufficient for improving reactivity, while addition amounts thereof exceeding 90 parts by weight result in reduced stability of the composition.

The acylphosphine oxide compound of ingredient (B) is represented by the following general formula.

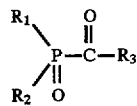

In the general formula, $R_1$ represents a lower alkyl group (the term "lower" as used herein means "1 to 5 carbon atoms"), a lower alkoxy group, an unsubstituted aryl group, or an aryl group substituted with one or more lower alkyl groups or halogen atoms; $R_2$ represents a lower alkoxy group, an unsubstituted aryl group, or an aryl group substituted with one or more lower alkyl groups or halogen atoms; and $R_3$ represents a linear or branched alkyl group having 2 to 18 carbon atoms and optionally substituted with one or more acetyloxy groups, a cycloalkyl group having 3 to 12 carbon atoms, an unsubstituted aryl group, an aryl group substituted with one or more lower alkyl groups, lower alkoxy groups or halogen atoms, or a group represented by the formula

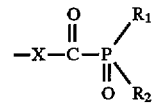

(wherein $R_1$ and $R_2$ are the same as defined above, and X represents a p-phenylene group).

Examples of $R_1$ in the above general formula, which represents an ingredient for use in this invention, include linear or branched lower alkyl groups such as methyl, ethyl, isopropyl, and n-butyl, lower alkoxy groups such as methoxy, ethoxy, isopropoxy, butoxy, and ethyloxyethoxy, aryl groups such as phenyl and naphthyl, halogen-substituted aryl groups such as mono- or dichlorophenyl, and alkyl-substituted phenyl groups such as methylphenyl, ethylphenyl, isopropylphenyl, tert-butylphenyl, and dimethylphenyl. Examples of $R_2$ include the same groups as the examples of $R_1$ except the lower alkyl groups.

Examples of $R_3$ include ethyl, isopropyl, n-propyl, n-butyl, isobutyl, tert-butyl, isoamyl, n-hexyl, heptyl, n-octyl, 2-ethylhexyl, isononyl, dimethylheptyl, lauryl, stearyl, cyclopropyl, cyclobutyl, cyclopentyl, 1-methylcyclopentyl, cyclohexyl, 1-methylcyclohexyl, norbornadienyl, adamantyl, dimethyloctyl, dimethylnonyl, dimethyldecyl, methylphenyl, dimethylphenyl, trimethylphenyl, tert-butylphenyl, isopropylphenyl, methoxyphenyl, dimethoxyphenyl, isopropoxyphenyl, α- and β-naphthyls, and β-acetoxyethyl. Especially preferred of these are 2,6-dimethylphenyl, 2,6-dimethoxyphenyl, 2,6-dichlorophenyl, and 2,6-dibromophenyl.

$R_1$ and $R_2$ each may contain a C—C double bond which enables the photoinitiator to be incorporated into a polymer backbone through polymerization.

Specific examples of the acylphosphine oxide compound for use in the present invention include methyl isobutyrylmethylphosphinate, methyl isobutyrylphenylphosphinate, methyl pivaloylphenylphosphinate, methyl 2-ethylhexanoylphenylphosphinate, isopropyl pivaloylphenylphosphinate, methyl p-toluylphenylphosphinate, methyl o-toluylphenylphosphinate, methyl 2,4-dimethylbenzoylphenylphosphinate, isopropyl p-tert-butylbenzoylphenylphosphinate, methyl pivaloyl-4-methylphenylphosphinate, vinyl pivaloylphenylphosphinate, methyl acryloylphenylphosphinate, isobutyryldiphenylphosphine oxide, pivaloyldiphenylphosphine oxide, 1-methyl-1-cyclohexanoyldiphenylphosphine oxide, 2-ethylhexanoyldiphenylphosphine oxide, p-toluyldiphenylphosphine oxide, o-toluyldiphenylphosphine oxide, p-tert-butylbenzoyldiphenylphosphine oxide, acryloyldiphenylphosphine oxide, benzoyldiphenylphosphine oxide, 2,2-dimethylheptanoyldiphenylphosphine oxide, terephthaloylbis(diphenyl)phosphine oxide, and adipoylbis (diphenyl)phosphine oxide. Further, preferred examples of the acylphosphine oxide compound include 2,6-dimethylbenzoyldiphenylphosphine oxide, methyl 2,6-dimethoxybenzoylphenylphosphinate, 2,6-dimethoxybenzoyldiphenylphosphine oxide, methyl-2,4,6-trimethylbenzoylphenylphosphinate, 2,4,6-trimethylbenzoyldiphenylphosphine oxide, 2,3,6-trimethylbenzoyldiphenylphosphine oxide, methyl 2,4,6- trimethylbenzoylphenylphosphinate, 2,4,6-trimethoxybenzoyldiphenylphosphine oxide, methyl 2,6-dichlorobenzoylphenylphosphinate, 2,6-dichlorobenzoyldiphenylphosphine oxide, 2,3,4,6-tetramethylbenzoyldiphenylphosphine oxide, 2,6-dibromobenzoyldiphenylphosphine oxide, 1,3-dimethylnaphthalene-2-carbonyldiphenylphosphine oxide, 2,8-dimethylnaphthalene-1-carbonyldiphenylphosphine oxide, 1,3-dimethoxynaphthalene-2-carbonyldiphenylphosphine oxide, 1,3-dichloronaphthalene-2-carbonyldiphenylphosphine oxide, 2,4,6-trimethylbenzoyldiphenylphosphine oxide, and 2,6-dimethoxybenzoyldiphenylphosphine oxide. The most preferable of these is 2,4,6-trimethylbenzoyldiphenylphosphine oxide (hereinafter abbreviated as TMDPO).

The α-aminoacetophenone compound of ingredient (C) is a compound represented by the following formula or an addition salt thereof with an acid:

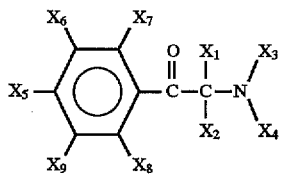

wherein (1) $X_1$ each represents a group represented by any of the following (a) (b) and (c):

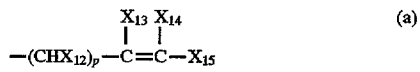

(wherein p is 0 or 1)

(wherein q is 0, 1, 2, or 3)

(wherein Y represents a hydrogen atom, a halogen atom, an OH group, an alkyl group having 1 to 12 carbon atoms, —$N(X_{10})_2$ (where $X_{10}$ represents a hydrogen atom, an alkyl group having 1 to 8 carbon atoms, an alkenyl group having 3 to 5 carbon atoms, a phenylalkyl group having 7 to 9 carbon atoms, a hydroxyalkyl group having 1 to 4 carbon atoms, or a phenyl group), an alkoxy group having 1 to 12 carbon atoms, —COOR (where R is an alkyl having 1 to 18 carbon atoms), —$CO(OCH_2OCH_2)_nOCH_3$ (where n is an integer of 1 to 20), —OCOR (where R is an alkyl having 1 to 4 carbon atoms), —$(OCH_2CH_2)_nOH$ (where n is an integer of 1 to 20), —$(OCH_2OCH_2)_nOCH_3$ (where n is an integer of 1 to 20), an alkylthio group having 1 to 8 carbon atoms, a phenoxy group, a phenyl group, a benzyl group, a naphthyl, a furyl group, a thienyl group, or pyridyl group; $X_{12}$ represents a hydrogen atom, an alkyl group having 1 to 8 carbon atoms, or a phenyl group; and $X_{13}$, $X_{14}$, and $X_{15}$ each independently represents a hydrogen atom, an alkyl group having 1 to 4 carbon atoms, or $X_{13}$ and $X_{14}$ are crosslinked to each other to form an alkylene group having 3 to 7 carbon atoms), (2) $X_2$ is the same as $X_1$ or represents a cycloalkyl group having 5 or 6 carbon atoms, an alkyl group having 1 to 12 carbon atoms and optionally substituted with one or more substituents selected from alkoxy groups each having 1 to 4 carbon atoms, phenoxy, halogen atoms, and phenyl, or a phenyl group optionally substituted with one or more substituents selected from halogen atoms, alkyl groups each having 1 to 12 carbon atoms, and alkoxy groups each having 1 to 4 carbon atoms, (3) provided that $X_1$ and $X_2$ may be crosslinked to each other to form a group represented by either of the formulae

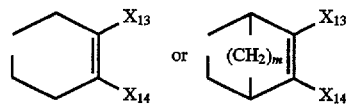

(wherein m is 1 or 2), (4) $X_3$ represents a hydrogen atom, an alkyl group having 1 to 12 carbon atoms, an alkyl group having 2 to 4 carbon atoms and substituted with one or more substituents selected from hydroxy, alkoxy groups each having 1 to 4 carbon atoms, —CN, and —COOR (where R is an alkyl having 1 to 4 carbon atoms), an alkenyl group having 3 to 5 carbon atoms, a cycloalkyl group having 5 to 12 carbon atoms, or a phenylalkyl group having 7 to 9 carbon atoms, (5) $X_4$ represents an alkyl group having 1 to 12 carbon atoms, an alkyl group having 2 to 4 carbon atoms and substituted with one or more substituents selected from hydroxy, alkoxy groups each having 1 to 4 carbon atoms, —CN, and —COOR (where R is an alkyl having 1 to 4 carbon atoms), an alkenyl group having 3 to 5 carbon atoms, a cycloalkyl group having 5 to 12 carbon atoms, a phenylalkyl group having 7 to 9 carbon atoms, a phenyl group, or a phenyl group substituted with one or more substituents selected from halogen atoms, alkyl groups each having 1 to 12 carbon atoms, alkoxy groups each having 1 to 4 carbon atoms, and -COOR (where R is an alkyl having 1 to 4 carbon atoms), (6) provided that $X_2$ and $X_4$ may be crosslinked to each other to form an alkylene group having 1 to 7 carbon atoms, a phenylalkylene group having 7 to 10 carbon atoms, an o-xylylene group, a 2-butenylene group, or an oxa- or azaalkylene group having 2 or 3 carbon atoms, (7) and that $X_3$ and $X_4$ may be crosslinked to each other to form an alkylene group having 3 to 7 carbon atoms and optionally substituted with one or more substituents selected from hydroxy, alkoxy groups each having 1 to 4 carbon atoms, and —COOR (where R is an alkyl having 1 to 4 carbon atoms) or to form an alkylene group which has 3 to 7 carbon atoms and the backbone of which is interrupted by —O—, —S—, —CO—, or —$N(X_{16})$— {where $X_{16}$ represents a hydrogen atom, an alkyl group having 1 to 12 carbon atoms, or an alkyl group which has 1 to 12 carbon atoms and the backbone of which is interrupted by one or more members selected from —O—, alkenyl groups each having 3 to 5 carbon atoms, phenylalkyl groups each having 7 to 9 carbon atoms, hydroxyalkyl groups each having 1 to 4 carbon atoms, —$CH_2CH_2CN$, —$CH_2CH_2COOR$ (where R is an alkyl having 1 to 4 carbon atoms), alkanoyl groups each having 2 to 8 carbon atoms, and benzoyl}, and (8) $X_5$, $X_6$, $X_7$, $X_8$, and $X_9$ each independently represents a hydrogen atom, a halogen atom, an alkyl group having 1 to 12 carbon atoms, a cycloalkyl group having 5 or 6 carbon atoms, a phenyl group, a benzyl group, a benzoyl group, a group represented by —$OX_{17}$, —$SX_{18}$, —SO—$X_{18}$, —$SO_2$—$X_{18}$, —$N(X_{19})(X_{20})$, or —NH—$SO_2$—$X_{21}$, or a group represented by the formula

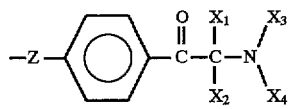

(wherein Z represents —O—, —S—, —N(X$_{10}$)—, —N(X$_{10}$)—X$_{11}$—N(X$_{10}$)—, or the group represented by the formula

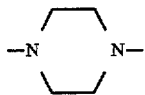

and X$_1$, X$_2$, X$_3$, and X$_4$ are the same as defined above), wherein X$_{10}$ is the same as defined above; X$_{11}$ represents a linear or branched alkylene group having 2 to 16 carbon atoms or a linear or branched alkylene group which has 2 to 16 carbon atoms and the backbone of which is interrupted by one or more members selected from —O—, —S—, and —N(X$_{10}$) (where X$_{10}$ is the same as defined above); X$_{17}$ represents a hydrogen atom, an alkyl group having 1 to 12 carbon atoms, an alkyl group having 1 to 6 carbon atoms and substituted with one or more substituents selected from —CN, —OH, alkoxy groups each having 1 to 4 carbon atoms, alkenoxy groups each having 3 to 6 carbon atoms, —OCH$_2$CH$_2$CN, —CH$_2$CH$_2$COOR (where R is an alkyl having 1 to 4 carbon atoms), —COOH, and —COOR (where R is an alkyl having 1 to 4 carbon atoms), a group represented by —(CH$_2$CH$_2$O)$_n$H (where n is 2 to 20), an alkanoyl group having 2 to 8 carbon atoms, an alkenyl group having 3 to 12 carbon atoms, a cyclohexyl group, a hydroxycyclohexyl group, a phenyl group, a phenyl group substituted with one or more substituents selected from halogen atoms, alkyl groups each having 1 to 12 carbon atoms, and alkoxy groups each having 1 to 4 carbon atoms, a phenylalkyl group having 7 to 9 carbon atoms, or a group represented by —Si(R$_4$)$_r$(R$_5$)$_{3-r}$ (where R$_4$ is an alkyl having 1 to 8 carbon atoms, R$_5$ is phenyl, and r is 1, 2, or 3); X$_{18}$ represents a hydrogen atom, an alkyl group having 1 to 12 carbon atoms, an alkenyl group having 3 to 12 carbon atoms, a cyclohexyl group, an alkyl group having 1 to 6 carbon atoms and substituted with one or more substituents selected from —SH, —OH, —CN, —COOR (where R is an alkyl having 1 to 4 carbon atoms), alkoxy groups each having 1 to 4 carbon atoms, —OCH$_2$CH$_2$CN, and —OCH$_2$CH$_2$COOR (where R is an alkyl having 1 to 4 carbon atoms), a phenyl group, a phenyl group substituted with one or more substituents selected from halogen atoms, alkyl groups each having 1 to 12 carbon atoms, and alkoxy groups each having 1 to 4 carbon atoms, or a phenylalkyl group having 7 to 9 carbon atoms; X$_{19}$ and X$_{20}$ each independently represents a hydrogen atom, an alkyl group having 1 to 12 carbon atoms, a hydroxyalkyl group having 2 to 4 carbon atoms, an alkoxyalkyl group having 2 to 10 carbon atoms, an alkenyl group having 3 to 5 carbon atoms, a cycloalkyl group having 5 to 12 carbon atoms, a phenylalkyl group having 7 to 9 carbon atoms, a phenyl group, a phenyl group substituted with one or more substituents selected from halogen atoms, alkyl groups each having 1 to 12 carbon atoms, and alkoxy groups each having 1 to 4 carbon atoms, an alkanoyl group having 2 or 3 carbon atoms, or a benzoyl group, or X$_{19}$ and X$_{20}$ are crosslinked to each other to form an alkylene group having 2 to 8 carbon atoms and optionally substituted with one or more substituents selected from hydroxy, alkoxy groups each having 1 to 4 carbon atoms, and —COOR (where R is an alkyl having 1 to 4 carbon atoms) or to form an alkylene group which has 2 to 8 carbon atoms and the backbone of which is interrupted by —O—, —S—, or —N(X$_{16}$)— (where X$_{16}$ is the same as defined above); and X$_{21}$ represents an alkyl group having 1 to 18 carbon atoms, a phenyl group optionally substituted with one or more substituents selected from halogen atoms, alkyl groups each having 1 to 12 carbon atoms, and alkoxy groups each having 1 to 8 carbon atoms, or a naphthyl group.

Specific examples of the α-aminoacetophenone compound for use in the present invention include (1) 2-(dimethylamino)-2-ethyl-1-(4-morpholinophenyl)-4-penten-1-one,
(2) 2-(dimethylamino)-2-methyl-1-(4-morpholinophenyl)-4-penten-1-one,
(3) 2-benzyl-2-(dimethylamino)-1-(4-morpholinophenyl) propan-1-one,
(4) 4-morpholino-4-(4-morpholinobenzyl)hepta-1,6-diene,
(5) 2-ethyl-2-morpholino-1-(4-morpholinophenyl)-4-penten-1-one,
(6) 2-benzyl-2-(dimethylamino)-1-[4-(dimethylamino) phenyl]-butan-1-one,
(7) 4-dimethylamino-4-(4-dimethylaminobenzoyl)hepta-1,6-diene,
(8) 4-(dimethylamino)-4-(4-morpholinobenzoyl)hepta-1,6-diene,
(9) 2-(dimethylamino)-2-(4-dimethylaminophenyl)-2-ethyl-4-penten-1-one,
(10) 2-benzyl-2-(dimethylaminophenyl)-2-ethyl-4-penten-1-one,
(11) 2-benzyl-2-(dimethylamino)-1-[4-(dimethylamino) phenyl]-4-penten-1-one,
(12) 2-benzyl-1-[4-(dimethylamino)phenyl]-2-(dimethylamino)-3-phenylpropan-1-one,
(13) 2-ethyl-1-[4-(methylthio)phenyl]-2-morpholino-4-penten-1-one,
(14) 2-methyl-1-[4-(methylthio)phenyl]-2-morpholinopropan-1-one,
(15) 4-[4-(methylthio)benzoyl]-4-morpholinohepta-1,6-diene,
(16) 4-(dimethylamino)-4-(4-methoxybenzoyl)hepta-1,6-diene, (17) 2-benzyl-2-(dimethylamino)-1-[4-(methylthio)phenyl]-butan-1-one,
(18) 2-benzyl-2-(dimethylamino)-1-(4-morpholinophenyl)-3-phenylpropan-1-one,
(19) 2-benzyl-2-(dimethylamino)-1-(4-hydroxyphenyl) butan-1-one,
(20) 2-benzyl-2-(dimethylamino)-1-phenylpropan-1-one,
(21) 2-benzyl-2-(benzylmethylamino)-1-(4-morpholinophenyl)-4-butan-1-one,
(22) 2-benzyl-2-(dimethylamino)-1-(4-morpholinophenyl) pentan-1-one,
(23) 2-benzyl-2-(diethylamino)-1-(4-morpholinophenyl) butan-1 -one,
(24) 2-benzyl-2-(dimethylamino)-1-(4-morpholinophenyl) hexan-1-one, and
(25) 2-benzyl-2-(dimethylamino)-1-(4-morpholinophenyl) butan-1-one.

The most desirable of these is 2-benzyl-2-(dimethylamino)-1-(4-morpholinophenyl)butan-1-one (hereinafter referred to as No. 25).

In the present invention, one of ingredients (B) and (C) or a mixture of at least one of each of ingredients (B) and (C) can be used. The amount of this photopolymerization initiator is not particularly limited as long as it is sufficient for the initiator to function as a photopolymerization catalyst to impart photocurability to the composition. Although the incorporation amount thereof varies depending on the radical-polymerizable compound used, it is preferably from 0.01 to 20 parts by weight, more preferably from 0.05 to 10 parts by weight, per 100 parts by weight of the total amount of the composition exclusive of ingredient (B) and/or (C). If the amount of the photopolymerization initiator is smaller than 0.01 part by weight, the reactivity of the composition is so low that the reaction does not proceed sufficiently. If the amount thereof exceeds 20 parts by weight, the composition has poor stability and the cured composition obtained therefrom has reduced performance.

Bonding of optical disks is accomplished as follows. The photocurable adhesive described above is applied to the bonding surface(s) of one or both of two optical disk substrates, and the disk substrates are superposed and pressed to each other. Alternatively, two optical disk substrates are superposed on each other, and the photocurable adhesive is injected into the space between the superposed substrates. Finally, the adhesive layer is irradiated with light from the back side of the bonding surface(s). Since the transmitted light in the bonding of optical disks generally has considerably reduced energy, the highly photoreactive adhesive of the present invention is extremely effective.

EXAMPLES AND COMPARATIVE EXAMPLES

The present invention will be explained below in more detail by reference to Examples and Comparative Examples, but the invention should not be construed as being limited to these Examples.

Preparation

In a light-shielded vessel, a mixture of predetermined radical-polymerizable vinyl compounds was mixed with a predetermined photopolymerization catalyst. The resulting mixture was stirred with heating at 60° C. Thus, homogeneous photocurable adhesives were prepared.

Evaluation

Each adhesive was applied to both of two optical disks (diameter, 12 cm), and the disks were then superposed on each other in such a manner as to avoid air inclusion. The superposed disks were irradiated with light for bonding. The bonded optical disks were evaluated for appearance. Further, the bonded disks were peeled apart, and the state of curing of the adhesive present between the disks was evaluated by touching with the hand. The results of these evaluations are shown in Table 1, in which the sufficiently cured state is indicated by o, an undercured state with tackiness is indicatedby Δ, and a liquid state is indicated by x. Stability to fluorescent light was examined by allowing each adhesive to stand in a room illuminated with a fluorescent lamp; adhesives which did not gel in 24 hours are indicated by o, while adhesives which partly gelled are indicated by Δ.

Ingredients used in the Examples and Comparative Examples are shown below.

UN-9200A: Polycarbonate-modified urethane acrylate (trade name; manufactured by Negami Kogyo K.K., Japan)

No. 25: The aminoacetophenone compound specified hereinabove

BDK: Benzyl dimethyl ketal

TABLE 1

| Photocurable adhesive Ingredient | | Example No. | | | | | | | | Comparative Example No. | | | |
|---|---|---|---|---|---|---|---|---|---|---|---|---|---|
| | | 1 | 2 | 3 | 4 | 5 | 6 | 7 | 8 | 1 | 2 | 3 | 4 |
| A | Urethane arylate UN-9200A | 50 | 50 | 50 | 50 | 50 | 50 | 50 | 30 | 50 | 50 | 50 | 50 |
| | 1,6-Hexanediol diacrylate | 50 | 50 | 40 | 30 | 21 | 21 | 10 | 10 | 50 | 50 | 50 | 50 |
| | Acryloylmorpholine | 0 | 0 | 10 | 21 | 30 | 30 | 40 | 60 | 0 | 0 | 0 | 0 |
| B | TMDPO | 1 | 0 | 1 | 1 | 1 | 1 | 1 | 1 | 0 | 0 | 0 | 0 |
| C | No. 25 | 0 | 1 | 0 | 0 | 0 | 1 | 0 | 0 | 0 | 0 | 0 | 0 |
| | BDK | 0 | 0 | 0 | 0 | 0 | 0 | 0 | 0 | 2 | 4 | 0 | 0 |
| | Camphorquinone | 0 | 0 | 0 | 0 | 0 | 0 | 0 | 0 | 0 | 0 | 2 | 4 |
| State of curing | 100 mJ/cm$^2$ | x | x | Δ | Δ | o | o | o | o | x | x | x | x |
| | 200 mJ/cm$^2$ | Δ | Δ | o | o | o | o | o | o | x | x | x | x |
| | 300 mJ/cm$^2$ | o | o | o | o | o | o | o | o | x | x | x | x |
| | 500 mJ/cm$^2$ | o | o | o | o | o | o | o | o | x | x | x | Δ |
| | 1000 mJ/cm$^2$ | o | o | o | o | o | o | o | o | x | x | Δ | Δ |
| | *Disk appearance | transparent | pale yellow | transparent | | | | pale yellow | pale yellow | yellow | | | |
| Stability to fluorescent light | | o | o | o | o | o | o | Δ | Δ | o | o | Δ | Δ |

The results for the Examples and Comparative Examples show the following. In the bonding of optical disks in which the substrate had an information recording layer and hence had a low light transmittance, the photocurable adhesives each containing a conventional photopolymerization catalyst remained uncured or undercured and underwent distinct yellowing. In contrast, the photocurable adhesives according to the present invention were effective in speedily completing the bonding, so that optical disks having a satisfactory appearance could be obtained in an extremely short time period.

By use of the adhesive for optical disks according to the present invention, optical disk substrates having an extremely low light transmittance can be easily bonded in a short time period without impairing the appearance thereof.

While the invention has been described in detail and with reference to specific embodiments thereof, it will be apparent to one skilled in the art that various changes and modifications can be made therein without departing from the spirit and scope thereof.

What is claimed is:

1. An optical disk comprising:

a first transparent substrate having a bonding surface;

a second transparent substrate having a bonding surface; and a photocurable adhesive for bonding the respective bonding surfaces of the first transparent substrate and the second transparent substrate, wherein an information recording layer is formed on either or both of the bonding surfaces of the first transparent substrate and the second transparent substrate, and wherein the photocurable adhesive comprises: a radical-polymerizable vinyl compound as an ingredient (A) and at least one photopolymerization initiator selected from the group consisting of an acylphosphine oxide compound as an ingredient (B) and an α-aminoacetophenone compound as an ingredient (C), wherein the ingredient (B) is represented by the following formula:

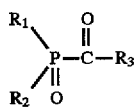

wherein $R_1$ represents a lower alkyl group, a lower alkoxy group, an unsubstituted aryl group, or an aryl group substituted with one or more lower alkyl groups or halogen atoms; $R_2$ represents a lower alkoxy group, an unsubstituted aryl group, or an aryl group substituted with one or more lower alkyl groups or halogen atoms; and $R_3$ represents a linear or branched alkyl group having 2 to 18 carbon atoms optionally substituted with one or more acetyloxy groups, a cycloalkyl group having 3 to 12 carbon atoms, an unsubstituted aryl group, an aryl group substituted with one or more lower alkyl groups, lower alkoxy groups or halogen atoms, or a group represented by the formula:

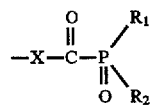

wherein $R_1$ and $R_2$ are the same as defined above, and X represents a p-phenylene group, the ingredient (C) is represented by the following formula or an acid adduct salt thereof:

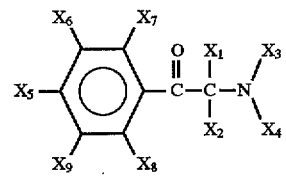

wherein
   (1) $X_1$ represents a group represented by either of the groups represented by the following formula (a), (b) and (c):

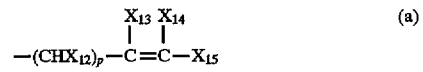

wherein p is 0 or 1

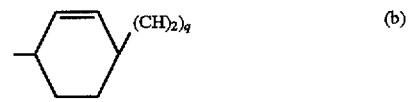

wherein q is 0, 1, 2, or 3

wherein Y represents a hydrogen atom, a halogen atom, an OH group, an alkyl group having 1 to 12 carbon atoms, —$N(X_{10})_2$ where $X_{10}$ represents a hydrogen atom, an alkyl group having 1 to 8 carbon atoms, an alkenyl group having 3 to 5 carbon atoms, a phenylalkyl group having 7 to 9 carbon atoms, a hydroxyalkyl group having 1 to 4 carbon atoms, or a phenyl group), an alkoxy group having 1 to 12 carbon atoms, —COOR where R is an alkyl having 1 to 18 carbon atoms, —$CO(OCH_2OCH_2)_nOCH_3$ where n is an integer of 1 to 20, —OCOR where R is an alkyl having 1 to 4 carbon atoms, —$(OCH_2CH_2)_nOH$ where n is an integer of 1 to 20, —$(OCH_2OCH_2)_nOCH_3$ where n is an integer of 1 to 20, an alkylthio group having 1 to 8 carbon atoms, a phenoxy group, a phenyl group, a benzyl group, a naphthyl, a furyl group, a thienyl group, or pyridyl group; $X_{12}$ represents a hydrogen atom, an alkyl group having 1 to 8 carbon atoms, or a phenyl group; and $X_{13}$, $X_{14}$, and $X_{15}$ each independently represents a hydrogen atom, an alkyl group having 1 to 4 carbon atoms, or $X_{13}$ and $X_{14}$ are linked to each other to form an alkylene group having 3 to 7 carbon atoms, (2) $X_2$ is the same as $X_1$ or represents a cycloalkyl group having 5 or 6 carbon atoms, an alkyl group having 1 to 12 carbon atoms and optionally substituted with one or more substituents selected from alkoxy groups each having 1 to 4 carbon atoms, phenoxy, halogen atoms, and phenyl, or a phenyl group optionally substituted with one or more substituents selected from halogen atoms, alkyl groups each having 1 to 12 carbon atoms, and alkoxy groups each having 1 to 4 carbon atoms, (3) provided that $X_1$ and $X_2$ optionally are linked to each other to form a group represented by either of the formulae:

wherein m is 1 or 2, (4) $X_3$ represents a hydrogen atom, an alkyl group having 1 to 12 carbon atoms, an alkyl group having 2 to 4 carbon atoms and substituted with one or more substituents selected from hydroxy, alkoxy groups each having 1 to 4 carbon atoms, —CN, and —COOR where R is an alkyl having 1 to 4 carbon atoms, an alkenyl group having 3 to 5 carbon atoms, a cycloalkyl group having 5 to 12 carbon atoms, or a phenylalkyl group having 7 to 9 carbon atoms, (5) $X_4$ represents an alkyl group having 1 to 12 carbon atoms, an alkyl group having 2 to 4 carbon atoms and substituted with one or more substituents selected from hydroxy, alkoxy groups each having 1 to 4 carbon atoms, —CN, and —COOR where R is an alkyl having 1 to 4 carbon atoms, an alkenyl group having 3 to 5 carbon atoms, a cycloalkyl group having 5 to 12 carbon atoms, a phenylalkyl group having 7 to 9 carbon atoms, a phenyl group, or a phenyl group substituted with one or more substituents selected from halogen atoms, alkyl groups each having 1 to 12 carbon atoms, alkoxy groups each having 1 to 4 carbon atoms, and —COOR where R is an alkyl having 1 to 4 carbon atoms, (6) provided that $X_2$ and $X_4$ optionally are linked to each other to form an alkylene group having 1 to 7 carbon atoms, a phenylalkylene group having 7 to 10 carbon atoms, an o-xylylene group, a 2-butenylene group, or an oxa- or azaalkylene group having 2 or 3 carbon atoms, (7) and that $X_3$ and $X_4$ optionally are linked to each other to form an alkylene group having 3 to 7 carbon atoms and optionally substituted with one or more substituents selected from hydroxy, alkoxy groups each having 1 to 4 carbon atoms, and —COOR where R is an alkyl having 1 to 4 carbon atoms or to form an alkylene group which has 3 to 7 carbon atoms and the backbone of which is interrupted by —O—, —S—, —CO—, or —N($X_{16}$)— where $X_{16}$ represents a hydrogen atom, an alkyl group having 1 to 12 carbon atoms, or an alkyl group which has 1 to 12 carbon atoms and the backbone of which is interrupted by one or more members selected from —O—, alkenyl groups each having 3 to 5 carbon atoms, phenylalkyl groups each having 7 to 9 carbon atoms, hydroxyalkyl groups each having 1 to 4 carbon atoms, —CH$_2$CH$_2$CN, —CH$_2$CH$_2$COOR where R is an alkyl having 1 to 4 carbon atoms, alkanoyl groups each having 2 to 8 carbon atoms, and benzoyl, and (8) $X_5$, $X_6$, $X_7$, $X_8$, and $X_9$ each independently represents a hydrogen atom, a halogen atom, an alkyl group having 1 to 12 carbon atoms, a cycloalkyl group having 5 or 6 carbon atoms, a phenyl group, a benzyl group, a benzoyl group, a group represented by —O$X_{17}$, —S$X_{18}$, —SO—$X_{18}$, —SO$_2$—$X_{18}$, —N($X_{19}$)($X_{20}$), or —NH—SO$_2$—$X_{21}$, or a group represented by the formula:

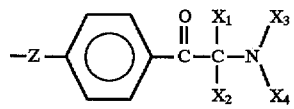

wherein Z represents —O—, —S—, —N ($X_{10}$)—, —N($X_{10}$)—$X_{11}$—N($X_{10}$)—, or the group represented by the formula:

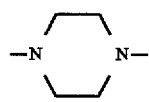

and $X_1$, $X_2$, $X_3$, and $X_4$ are the same as defined above, wherein $X_{10}$ is the same as defined above; $X_{11}$ represents a linear or branched alkylene group having 2 to 16 carbon atoms or a linear or branched alkylene group which has 2 to 16 carbon atoms and the backbone of which is interrupted by one or more members selected from —O—, —S—, and —N($X_{10}$) where $X_{10}$ is the same as defined above; $X_{17}$ represents a hydrogen atom, an alkyl group having 1 to 12 carbon atoms, an alkyl group having 1 to 6 carbon atoms and substituted with one or more substituents selected from —CN, —OH, alkoxy groups each having 1 to 4 carbon atoms, alkenoxy groups each having 3 to 6 carbon atoms, —OCH$_2$CH$_2$CN, —CH$_2$CH$_2$COOR where R is an alkyl having 1 to 4 carbon atoms, —COOH, and —COOR where R is an alkyl having 1 to 4 carbon atoms, a group represented by —(CH$_2$CH$_2$O)$_n$H where n is 2 to 20, an alkanoyl group having 2 to 8 carbon atoms, an alkenyl group having 3 to 12 carbon atoms, a cyclohexyl group, a hydroxycyclohexyl group, a phenyl group, a phenyl group substituted with one or more substituents selected from halogen atoms, alkyl groups each having 1 to 12 carbon atoms, and alkoxy groups each having 1 to 4 carbon atoms, a phenylalkyl group having 7 to 9 carbon atoms, or a group represented by —Si(R$_4$)$_r$(R$_5$)$_{3-r}$ where R$_4$ is an alkyl having 1 to 8 carbon atoms, R$_5$ is phenyl, and r is 1, 2, or 3; $X_{18}$ represents a hydrogen atom, an alkyl group having 1 to 12 carbon atoms, an alkenyl group having 3 to 12 carbon atoms, a cyclohexyl group, an alkyl group having 1 to 6 carbon atoms and substituted with one or more substituents selected from —SH, —OH, —CN, —COOR where R is an alkyl having 1 to 4 carbon atoms, alkoxy groups each having 1 to 4 carbon atoms, —OCH$_2$CH$_2$CN, and —OCH$_2$CH$_2$COOR where R is an alkyl having 1 to 4 carbon atoms, a phenyl group, a phenyl group substituted with one or more substituents selected from halogen atoms, alkyl groups each having 1 to 12 carbon atoms, and alkoxy groups each having 1 to 4 carbon atoms, or a phenylalkyl group having 7 to 9 carbon atoms; $X_{19}$ and $X_{20}$ each independently represents a hydrogen atom, an alkyl group having 1 to 12 carbon atoms, a hydroxyalkyl group having 2 to 4 carbon atoms, an alkoxyalkyl group having 2 to 10 carbon atoms, an alkenyl group having 3 to 5 carbon atoms, a cycloalkyl group having 5 to 12 carbon atoms, a phenylalkyl group having 7 to 9 carbon atoms, a phenyl group, a phenyl group substituted with one or more substituents selected from halogen atoms, alkyl groups each having 1 to 12 carbon atoms, and alkoxy groups each having 1 to 4 carbon atoms, an alkanoyl group having 2 or 3 carbon atoms, or a benzoyl group, or $X_{19}$ and $X_{20}$ are linked to each other to form an alkylene group having 2 to 8 carbon atoms and optionally substituted with one or more substituents selected from hydroxy, alkoxy groups each having 1 to 4 carbon atoms, and —COOR where R is an alkyl having 1 to 4 carbon atoms or to form an alkylene group which has 2 to 8 carbon atoms and the backbone of which is interrupted by —O—, —S—, or —N($X_{16}$)— where $X_{16}$ is the same as defined above; and $X_{21}$ represents an alkyl group having 1 to 18 carbon atoms, a phenyl group optionally substituted with one or more substituents selected from halogen atoms, alkyl groups each having 1 to 12 carbon atoms, and alkoxy groups each having 1 to 8 carbon atoms, or a naphthyl group, and the ingredient (A) contains (meth)acryloylmorpholine.

2. The optical disk as claimed in claim 1, wherein the amount of the (meth)acryloylmorphoine is from 1 to 90 parts by weight per 100 parts by weight of the ingredient (A).

3. The optical disk as claimed in claim 2, wherein the amount of the (meth)acryloylmorpholine is from 10 to 30 parts by weight per 100 parts by weight of the ingredient (A).

4. The optical disk as claimed in claim 1, wherein the amount of the photopolymerization initiator is from 0.01 to 20 parts by weight per 100 parts by weight of the total amount of the photocurable adhesive exclusive of the photopolymerization initiator.

5. The optical disk claimed in claim 4, wherein the photopolymerization initiator is the ingredient (B).

6. The optical disk as claimed in claim 4, wherein the photopolymerization initiator is the ingredient (C).

7. A method for producing an optical disk comprising a first and a second transparent substrates each having a bonding surface and having an information recording layer formed on either or both of the bonding surfaces and a photocurable adhesive for bonding the transparent substrates, the method comprising bonding the bonding surfaces of the first and second transparent substrates to each other using the photocurable adhesive, wherein the photocurable adhesive comprises: a radical-polymerizable vinyl compound as an ingredient (A) and at least one photopolymerization initiator selected from the group consisting of an acylphosphine oxide compound as an ingredient (B) and an α-aminoacetophenone compound as an ingredient (C), wherein the ingredient (B) is represented by the following formula:

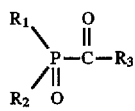

wherein $R_1$ represents a lower alkyl group, a lower alkoxy group, an unsubstituted aryl group, or an aryl group substituted with one or more lower alkyl groups or halogen atoms; $R_2$ represents a lower alkoxy group, an unsubstituted aryl group, or an aryl group substituted with one or more lower alkyl groups or halogen atoms; and $R_3$ represents a linear or branched alkyl group having 2 to 18 carbon atoms optionally substituted with one or more acetyloxy groups, a cycloalkyl group having 3 to 12 carbon atoms, an unsubstituted aryl group, an aryl group substituted with one or more lower alkyl groups, lower alkoxy groups or halogen atoms, or a group represented by the formula:

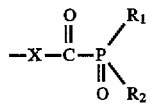

wherein $R_1$ and $R_2$ are the same as defined above, and X represents a p-phenylene group, the ingredient (C) is represented by the following formula or an acid adduct salt thereof:

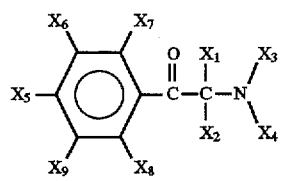

wherein (1) $X_1$ represents a group represented by either of the groups represented by the following formula (a), (b) and (c):

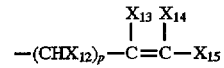

wherein p is 0 or 1

wherein q is 0, 1, 2, or 3

wherein Y represents a hydrogen atom, a halogen atom, an OH group, an alkyl group having 1 to 12 carbon atoms, $—N(X_{10})_2$ where $X_{10}$ represents a hydrogen atom, an alkyl group having 1 to 8 carbon atoms, an alkenyl group having 3 to 5 carbon atoms, a phenylalkyl group having 7 to 9 carbon atoms, a hydroxyalkyl group having 1 to 4 carbon atoms, or a phenyl group), an alkoxy group having 1 to 12 carbon atoms, —COOR where R is an alkyl having 1 to 18 carbon atoms, $—CO(OCH_2OCH_2)_nOCH_3$ where n is an integer of 1 to 20, —OCOR where R is an alkyl having 1 to 4 carbon atoms, $—(OCH_2CH_2)_nOH$ where n is an integer of 1 to 20, $—(OCH_2OCH_2)_nOCH_3$ where n is an integer of 1 to 20, an alkylthio group having 1 to 8 carbon atoms, a phenoxy group, a phenyl group, a benzyl group, a naphthyl, a furyl group, a thienyl group, or pyridyl group; $X_{12}$ represents a hydrogen atom, an alkyl group having 1 to 8 carbon atoms, or a phenyl group; and $X_{13}$, $X_{14}$, and $X_{15}$ each independently represents a hydrogen atom, an alkyl group having 1 to 4 carbon atoms, or $X_{13}$ and $X_{14}$ are linked to each other to form an alkylene group having 3 to 7 carbon atoms, (2) $X_2$ is the same as $X_1$ or represents a cycloalkyl group having 5 or 6 carbon atoms, an alkyl group having 1 to 12 carbon atoms and optionally substituted with one or more substituents selected from alkoxy groups each having 1 to 4 carbon atoms, phenoxy, halogen atoms, and phenyl, or a phenyl group optionally substituted with one or more substituents selected from halogen atoms, alkyl groups each having 1 to 12 carbon atoms, and alkoxy groups each having 1 to 4 carbon atoms, (3) provided that $X_1$ and $X_2$ optionally are linked to each other to form a group represented by either of the formulae:

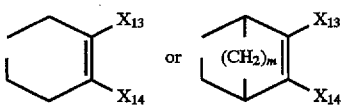

wherein m is 1 or 2, (4) $X_3$ represents a hydrogen atom, an alkyl group having 1 to 12 carbon atoms, an alkyl group having 2 to 4 carbon atoms and substituted with one or more substituents selected from hydroxy, alkoxy groups each having 1 to 4 carbon atoms, —CN, and —COOR where R is an alkyl having 1 to 4 carbon atoms, an alkenyl group having 3 to 5 carbon atoms, a cycloalkyl group having 5 to 12 carbon atoms, or a phenylalkyl group having 7 to 9 carbon atoms, (5) $X_4$ represents an alkyl group having 1 to 12 carbon atoms, an alkyl group having 2 to 4 carbon atoms and substituted with one or more substituents selected from hydroxy, alkoxy groups each having 1 to 4 carbon atoms, —CN, and —COOR where R is an alkyl having 1 to 4 carbon atoms, an alkenyl group having 3 to 5 carbon atoms, a cycloalkyl group having 5 to 12 carbon atoms, a phenylalkyl group having 7 to 9 carbon atoms, a phenyl group, or a phenyl group substituted with one or more substituents selected from halogen atoms, alkyl groups each having 1 to 12 carbon atoms, alkoxy groups each having 1 to 4 carbon atoms, and —COOR where R is an alkyl having 1 to 4 carbon atoms, (6) provided that $X_2$ and $X_4$ optionally are linked to each other to form an alkylene group having 1 to 7 carbon atoms, a phenylalkylene group having 7 to 10 carbon atoms, an o-xylylene group, a 2-butenylene group, or an oxa- or azaalkylene group having 2 or 3 carbon atoms, (7) and that $X_3$ and $X_4$ optionally are linked to each other to form an alkylene group having 3 to 7 carbon atoms and optionally substituted with one or more substituents selected from hydroxy, alkoxy groups each having 1 to 4 carbon atoms, and —COOR where R is an alkyl having 1 to 4 carbon atoms) or to form an alkylene group which has 3 to 7 carbon atoms and the backbone of which is interrupted by —O—, —S—, —CO—, or —N($X_{16}$)— where $X_{16}$ represents a hydrogen atom, an alkyl group having 1 to 12 carbon atoms, or an alkyl group which has 1 to 12 carbon atoms and the backbone of which is interrupted by one or more members selected from —O—, alkenyl groups each having 3 to 5 carbon atoms, phenylalkyl groups each having 7 to 9 carbon atoms, hydroxyalkyl groups each having 1 to 4 carbon atoms, —CH$_2$CH$_2$CN, —CH$_2$CH$_2$COOR where R is an alkyl having 1 to 4 carbon atoms, alkanoyl groups each having 2 to 8 carbon atoms, and benzoyl, and (8) $X_5$, $X_6$, $X_7$, $X_8$, and $X_9$ each independently represents a hydrogen atom, a halogen atom, an alkyl group having 1 to 12 carbon atoms, a cycloalkyl group having 5 or 6 carbon atoms, a phenyl group, a benzyl group, a benzoyl group, a group represented by —O$X_{17}$, —S$X_{18}$, —SO—$X_{18}$, —SO$_2$—$X_{18}$, —N($X_{19}$)($X_{20}$), or —NH—SO$_2$—$X_{21}$, or a group represented by the formula:

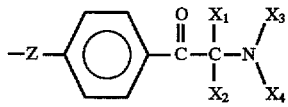

wherein Z represents —O—, —S—, —N($X_{10}$)—, —N($X_{10}$)—$X_{11}$—N($X_{10}$)—, or the group represented by the formula:

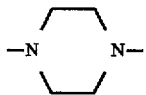

and $X_1$, $X_2$, $X_3$, and $X_4$ are the same as defined above, wherein $X_{10}$ is the same as defined above; $X_{11}$ represents a linear or branched alkylene group having 2 to 16 carbon atoms or a linear or branched alkylene group which has 2 to 16 carbon atoms and the backbone of which is interrupted by one or more members selected from —O—, —S—, and —N($X_{10}$) where $X_{10}$ is the same as defined above; $X_{17}$ represents a hydrogen atom, an alkyl group having 1 to 12 carbon atoms, an alkyl group having 1 to 6 carbon atoms and substituted with one or more substituents selected from —CN, —OH, alkoxy groups each having 1 to 4 carbon atoms, alkenoxy groups each having 3 to 6 carbon atoms, —OCH$_2$CH$_2$CN, —CH$_2$CH$_2$COOR where R is an alkyl having 1 to 4 carbon atoms, —COOH, and —COOR where R is an alkyl having 1 to 4 carbon atoms, a group represented by —(CH$_2$CH$_2$O)$_n$H where n is 2 to 20, an alkanoyl group having 2 to 8 carbon atoms, an alkenyl group having 3 to 12 carbon atoms, a cyclohexyl group, a hydroxycyclohexyl group, a phenyl group, a phenyl group substituted with one or more substituents selected from halogen atoms, alkyl groups each having 1 to 12 carbon atoms, and alkoxy groups each having 1 to 4 carbon atoms, a phenylalkyl group having 7 to 9 carbon atoms, or a group represented by —Si(R$_4$)$_r$(R$_5$)$_{3-r}$ where R$_4$ is an alkyl having 1 to 8 carbon atoms, R$_5$ is phenyl, and r is 1, 2, or 3 $X_{18}$ represents a hydrogen atom, an alkyl group having 1 to 12 carbon atoms, an alkenyl group having 3 to 12 carbon atoms, a cyclohexyl group, an alkyl group having 1 to 6 carbon atoms and substituted with one or more substituents selected from —SH, —OH, —CN, —COOR where R is an alkyl having 1 to 4 carbon atoms, alkoxy groups each having 1 to 4 carbon atoms, —OCH$_2$CH$_2$CN, and —OCH$_2$CH$_2$COOR where R is an alkyl having 1 to 4 carbon atoms, a phenyl group, a phenyl group substituted with one or more substituents selected from halogen atoms, alkyl groups each having 1 to 12 carbon atoms, and alkoxy groups each having 1 to 4 carbon atoms, or a phenylalkyl group having 7 to 9 carbon atoms; $X_{19}$ and $X_{20}$ each independently represents a hydrogen atom, an alkyl group having 1 to 12 carbon atoms, a hydroxyalkyl group having 2 to 4 carbon atoms, an alkoxyalkyl group having 2 to 10 carbon atoms, an alkenyl group having 3 to 5 carbon atoms, a cycloalkyl group having 5 to 12 carbon atoms, a phenylalkyl group having 7 to 9 carbon atoms, a phenyl group, a phenyl group substituted with one or more substituents selected from halogen atoms, alkyl groups each having 1 to 12 carbon atoms, and alkoxy groups each having 1 to 4 carbon atoms, an alkanoyl group having 2 or 3 carbon atoms, or a benzoyl group, or $X_{19}$ and $X_{20}$ are linked to each other to form an alkylene group having 2 to 8 carbon atoms and optionally substituted with one or more substituents selected from hydroxy, alkoxy groups each having 1 to 4 carbon atoms, and —COOR where R is an alkyl having 1 to 4 carbon atoms or to form an alkylene group which has 2 to 8 carbon atoms and the backbone of which is interrupted by —O—, —S—, or —N($X_{16}$)— where $X_{16}$ is the same as defined above; and $X_{21}$ represents an alkyl group having 1 to 18 carbon atoms, a phenyl group optionally substituted with one or more substituents selected from halogen atoms, alkyl groups each having 1 to 12 carbon atoms, and alkoxy groups each having 1 to 8 carbon atoms, or a naphthyl group, and the ingredient (A) contains (meth)acryloylmorpholine.

8. The method for producing an optical disk as claimed in claim 7, wherein the amount of the (meth)acryloylmorpholine is from 1 to 90 parts by weight per 100 parts by weight of the ingredient (A).

9. The method for producing an optical disk as claimed in claim 8, wherein the amount of the (meth)acryloylmorpholine is from 10 to 30 parts by weight per 100 parts by weight of the ingredient (A).

10. The method for producing an optical disk as claimed in claim 7, wherein the amount of the photopolymerization initiator is from 0.01 to 20 parts by weight per 100 parts by weight of the total amount of the photocurable adhesive exclusive of the photopolymer initiator.

11. The method for producing an optical disk as claimed in claim 10, wherein the photopolymerization initiator is the ingredient (B).

12. The method for producing an optical disk as claimed in claim 10, wherein the photopolymerization initiator is the ingredient (C).

* * * * *